United States Patent [19]
Qureshi et al.

[11] Patent Number: 5,894,578
[45] Date of Patent: *Apr. 13, 1999

[54] SYSTEM AND METHOD FOR USING RANDOM ACCESS MEMORY IN A PROGRAMMABLE INTERRUPT CONTROLLER

[75] Inventors: Qadeer A. Qureshi, Round Rock; Joseph A. Bailey; Dan S. Mudgett, both of Austin, all of Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/575,685

[22] Filed: Dec. 19, 1995

[51] Int. Cl.$^6$ ............................................. G06F 9/46
[52] U.S. Cl. .......................... 395/739; 38/740; 38/741; 38/742
[58] Field of Search ............................. 395/733, 742

[56] References Cited

U.S. PATENT DOCUMENTS

| | | |
|---|---|---|
| 3,421,150 | 1/1969 | Quosig et al. . |
| 3,665,415 | 5/1972 | Beard et al. . |
| 4,271,468 | 6/1981 | Christensen et al. . |
| 4,495,569 | 1/1985 | Kagawa . |
| 4,644,465 | 2/1987 | Imamura . |
| 4,985,831 | 1/1991 | Dulong et al. . |
| 5,125,093 | 6/1992 | McFarland . |
| 5,133,056 | 6/1992 | Miyamori . |
| 5,283,904 | 2/1994 | Carson et al. . |
| 5,317,747 | 5/1994 | Mochida et al. . |
| 5,359,715 | 10/1994 | Heil et al. . |
| 5,367,689 | 11/1994 | Mayer et al. . |
| 5,410,710 | 4/1995 | Sarangdhar et al. . |
| 5,428,790 | 6/1995 | Harper et al. .............. 395/750 |
| 5,428,794 | 6/1995 | Williams . |
| 5,428,799 | 6/1995 | Woods et al. . |
| 5,437,042 | 7/1995 | Culley et al. . |
| 5,446,847 | 8/1995 | Keeley et al. .............. 395/280 |
| 5,446,910 | 8/1995 | Kennedy et al. . |
| 5,495,615 | 2/1996 | Nizar et al. . |
| 5,724,590 | 3/1998 | Goettelmann et al. .......... 395/707 |

OTHER PUBLICATIONS

Intel MultiProcessor Specification Version 1.1, Apr. 1994, pp. 1–54.

*Primary Examiner*—Ayaz R. Sheikh
*Assistant Examiner*—Jigar Pancholi
*Attorney, Agent, or Firm*—Conley, Rose & Tayon, PC; B. Noel Kivlin

[57] ABSTRACT

A programmable interrupt controller for use in computer systems including one or more CPUs is provided. The programmable interrupt controller includes an interrupt request interface, a central interrupt controller, random access memory, and at least one processor interface. The central interrupt controller systematically selects interrupt requests from the interrupt request interface. Information associated with each interrupt request is stored in the random access memory. The central interrupt controller access the information in the random access memory and uses the information and the state of the currently selected interrupt request to determine a next state for the currently selected interrupt request. The information is passed on to the processor interface to determine when and if the interrupt request should issue to one of the CPUs.

16 Claims, 5 Drawing Sheets

| Status | Vector | Priority | Destination | Mask | Affinity | Type | Enabled |
|--------|--------|----------|-------------|------|----------|------|---------|

Exemplary Interrupt Field

FIG. 5

SYSTEM AND METHOD FOR USING RANDOM ACCESS MEMORY IN A PROGRAMMABLE INTERRUPT CONTROLLER

BACKGROUND OF THE INVENTION

1. Field of the Invention

The present invention relates to interrupts within a computer system, and more specifically to an interrupt controller for more efficient handling of interrupts in a computer system.

2. Description of the Related Art

A typical computer system contains at least one interrupt service provider, usually a central processing unit (CPU), and a number of input/output (I/O) devices peripheral to the CPU(s). These I/O devices commonly include hard disk drives, floppy disk drives, video adapters, parallel ports, serial ports, and other similar I/O type devices. An I/O device may need to alert the CPU(s) or request service when it completes a task or has a status change, such as finishing a data transfer, completing an operation, receiving data, or the occurrence of an error condition.

The typical mechanism for an I/O device to request service from the CPU(s) involves an interrupt request. An interrupt request is generally a hardware signal sent from the requesting device to a CPU notifying the CPU that the I/O device requires service. Other system devices such as timers, direct memory access (DMA) controllers, and other processors may generate interrupt request signals.

One advantage of using interrupts over other techniques, such as polling, is that the CPU is free to perform other operations between interrupts. When a CPU receives an interrupt request, it stops executing the current instruction routine, saves its state, and jumps to an interrupt service routine. The interrupt service routine includes instructions specific to the device requesting the interrupt so that the CPU can respond to the device condition or status change that instigated the interrupt request. When the interrupt service routine is completed, the CPU restores its state and returns to its location prior to the interrupt.

Referring to FIG. 1, a computer system 100 using interrupts is shown according to the prior art. The computer system 100 includes a CPU A 110a, and a main memory system 120 coupled to a host bus 180. The main memory system 120 typically includes a memory controller and system memory (not shown). A bus bridge 140 is coupled to the host bus 180 and an expansion bus 190 and typically includes a DMA controller (not shown). The expansion bus 190 typically conforms to a popular bus standard such as the Industry Standard Architecture (ISA), Extended Industry Standard Architecture (EISA), Microchannel Architecture (MCA), or Peripheral Component Interconnect (PCI). Alternatively, multiple expansion busses are included, such as a PCI bus further coupled to an ISA bus. Several I/O devices 150, 160, 170 are coupled to the expansion bus 190. The I/O devices 150, 160, 170 are typically devices such as a floppy disk drive, video adapter, parallel port, or other devices as are well known in the art.

The bus bridge 140 and the I/O devices 150, 160, 170 generate interrupt requests along interrupt request lines 142, 152, 162, 172, respectively, to notify the CPU A 110a that service is needed. The interrupt, requests along lines 142, 152, 162, 172 are collected by a programmable interrupt controller (PIC) 130. The programmable interrupt controller 130 is coupled to the host bus 180 and the expansion bus 190. Generally, when the programmable interrupt controller 130 receives one of the interrupt requests along lines 142, 152, 162, 172 it sends an interrupt signal on line 132 to the CPU A 110a. When the CPU A 110a receives the interrupt signal on line 132, it finishes its current operation and sends an interrupt acknowledge along line 112 to the programmable interrupt controller 130. When the programmable interrupt controller 130 receives the interrupt acknowledge it sends an interrupt vector to the CPU A 110a over the host bus 180. The interrupt vector indicates the location of the appropriate interrupt service routine to the CPU A 110a.

Generally speaking, in a typical system, a programmable interrupt controller receives the interrupt request signals from the various system devices and organizes the requests to be sent to the CPU(s). Normally, the programmable interrupt controller includes a mask register associated with each interrupt. The mask register is programmed to block a certain interrupt so that the CPU will not be interrupted by that particular interrupt. The programmable interrupt controller contains other registers associated with each interrupt for indicating information such as the interrupt status and interrupt vector for each interrupt.

The programmable interrupt controller also functions as an overall manager for interrupt requests. It receives the interrupt requests from each device, determines which requests are sent to the CPU(s) first, and handles new incoming interrupt requests. Some devices have more immediate need for service than other devices. Therefore, the programmable interrupt controller provides a priority system to be assigned to the interrupt requests. Generally, the programmable interrupt controller determines which one of the current interrupt requests has the highest priority and forwards that request to a CPU first. Occasionally, an interrupt request will be received by the programmable interrupt controller that has a higher priority than the interrupt request currently being serviced. One technique commonly employed to deal with this situation is interrupt nesting. In interrupt nesting, the programmable interrupt controller allows the incoming interrupt request to interrupt the servicing of an earlier interrupt request currently being .serviced if the incoming interrupt request is of higher priority than the earlier interrupt request currently being serviced. If the incoming interrupt request is not of higher priority, it is put in order with other pending interrupt requests, usually according to the source of the interrupt. However, this requires that the queue in each nesting buffer be of sufficient size to accommodate all of the potential interrupt sources. Accordingly, there is a need for an interrupt controller that will optimize the storage of pending interrupts.

In addition to resolving priority among devices needing to be serviced, the controller will also need to resolve a task priority to determine to which CPU in a multiple CPU system the interrupt should be sent Typically, the CPU or device servicing an interrupt is assigned a task priority according to the level of importance of the task being performed. When a new task is to be performed, it is customary to search for a device that has the lowest task priority, and assign the new task to that device (for an interrupt that does not have a destination previously specified). However, if more than one device shares the same task priority, there is a chance that one device will always end up performing the new task, while other devices a the same task priority level may never be assigned the task. Therefore, it would be desirable to introduce a scheme to ensure that no such uneven distribution of system load occurs.

It can easily be understood that a relatively large amount of time may pass before an interrupt request is serviced, especially if the interrupt request has a low priority. The amount of time between the assertion of an interrupt request and the actual servicing of the interrupt request is called the interrupt latency. A problem associated with large interrupt latencies is that the status of the requesting device may change during the latency period so that servicing is no longer required, and thus the CPU will unnecessarily execute the interrupt service routine. This unnecessary execution of interrupt service routines results in extra overhead because the CPU spends time trying to service a condition which no longer exists, and thus overall system throughput is degraded. Therefore, a technique is desired for preventing invalid interrupt requests from being sent to the CPU.

A typical programmable interrupt controller implementation includes storage registers associated with each interrupt which store the current state of the interrupt, such as pending or in-service. Also, storage registers are required to store information for each interrupt request, such as the vector information and the priority level. Interrupt request receiving circuitry in the programmable interrupt controller coordinates the interrupt request state and other information with processor interface circuitry in the programmable interrupt controller. For systems with a large number of interrupt request sources, the amount of circuitry required to implement the above storage registers is very large. If the system supports multiple CPUs, then the above storage registers may need to be repeated in the programmable interrupt controller for each CPU, further increasing the size of the circuitry. Also, a large amount of circuitry is required to coordinate, manage, and access the storage registers. For an integrated programmable interrupt controller, a large portion of the chip area is require to implement the storage registers and associated circuitry. Therefore, it is desirable to have a more efficient way of referencing and implementing the required storage information for each interrupt.

Additionally, a typical programmable interrupt controller includes control circuitry associated with each interrupt request input to track the changes in the state of the interrupt request. This control circuitry includes some storage elements that are used to store the current state, and some combinatorial logic to determine the outputs and the next state based on the current state and other inputs. Similar control circuitry is required for each interrupt request input. If the number of interrupt request inputs is large, the amount of circuitry required to implement all the control circuitry can become prohibitively large. Therefore, a more efficient way of implementing the interrupt request control circuitry is desired.

SUMMARY OF THE INVENTION

The present invention provides an improved programmable interrupt controller for use in a computer system including one or more CPUs. In one embodiment a programmable interrupt controller is coupled to a host bus and an expansion bus. At least one CPU and a main memory system are also coupled to the host bus. A bus bridge device couples the host bus to the expansion bus. At least one I/O device is coupled to the expansion bus and generates an interrupt request signal. The bus bridge and other bus devices may also generate interrupt request signals. The programmable interrupt controller receives the interrupt requests and provides processor interrupt signals to the one or more CPUs. The programmable interrupt controller also receives interrupt acknowledge signals from the one or more CPUs.

One embodiment of the programmable interrupt controller includes an interrupt request interface coupled to a central interrupt controller and to a random access memory. The central interrupt controller and random access memory are each coupled to at least one processor interface. Interrupt request signals are received by the interrupt request interface. The central interrupt controller selects one of the interrupt request signals and determines the current state of the interrupt request. Information associated with each interrupt request is stored in the random access memory. The information may include state information, an interrupt vector, a destination, mask indication, and a priority level for the associated interrupt request. The central interrupt controller accesses the information by providing read and write cycles to the random access memory. A unique interrupt identification code may be assigned to each interrupt request and used by the central interrupt controller to reference information in the random access memory for each interrupt request.

The central interrupt controller accesses the information associated with the selected interrupt request and determines a next state for the interrupt request based on the current state of the interrupt request and the associated information. The next state is stored in the random access memory as the state portion of the associated information. The central interrupt controller also provides the associated information to the appropriate processor interface which uses the information to determine if and when to issue a processor interrupt. The central controller also accesses the information in the random access memory to update and provide the information when the processor interface receives an interrupt acknowledge or end of interrupt command.

Broadly speaking, the present invention contemplate a computer system with an interrupt controller which includes an interrupt request interface for receiving interrupt requests, a random access memory for storing interrupt state information and other information, a central interrupt controller for accessing the random access memory to process interrupt requests, and at least one processor interface for interfacing interrupt requests to one or more CPUs. A unique interrupt identification code may be used to reference the interrupt request information in the random access memory. Use of random access memory and a central interrupt controller within a programmable interrupt controller provides for an efficient programmable interrupt controller implementation. For example, random access memory and a central controller may allow for less circuitry needed in a programmable interrupt controller implementation compared to a design using distributed control and registers to store the state and information for each interrupt request.

BRIEF DESCRIPTION OF THE DRAWINGS

A better understanding of the present invention can be obtained when the following detailed description of the preferred embodiment is considered in conjunction with the following drawings in which:

FIG. 5 illustrates an exemplary information field according to one embodiment of the present invention.

Figure 1:
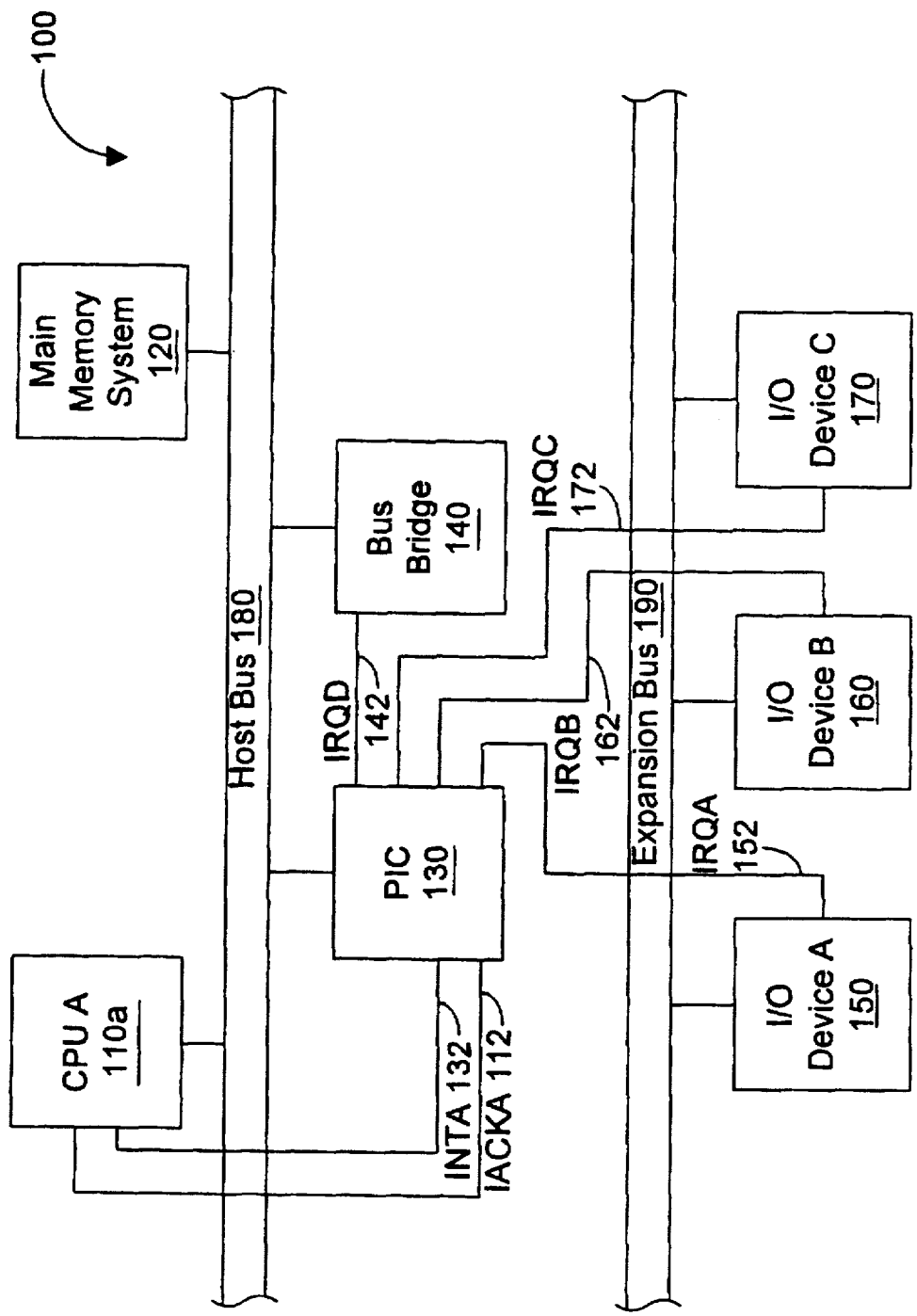
FIG. 1 is a block diagram illustrating a computer system with a programmable interrupt controller according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
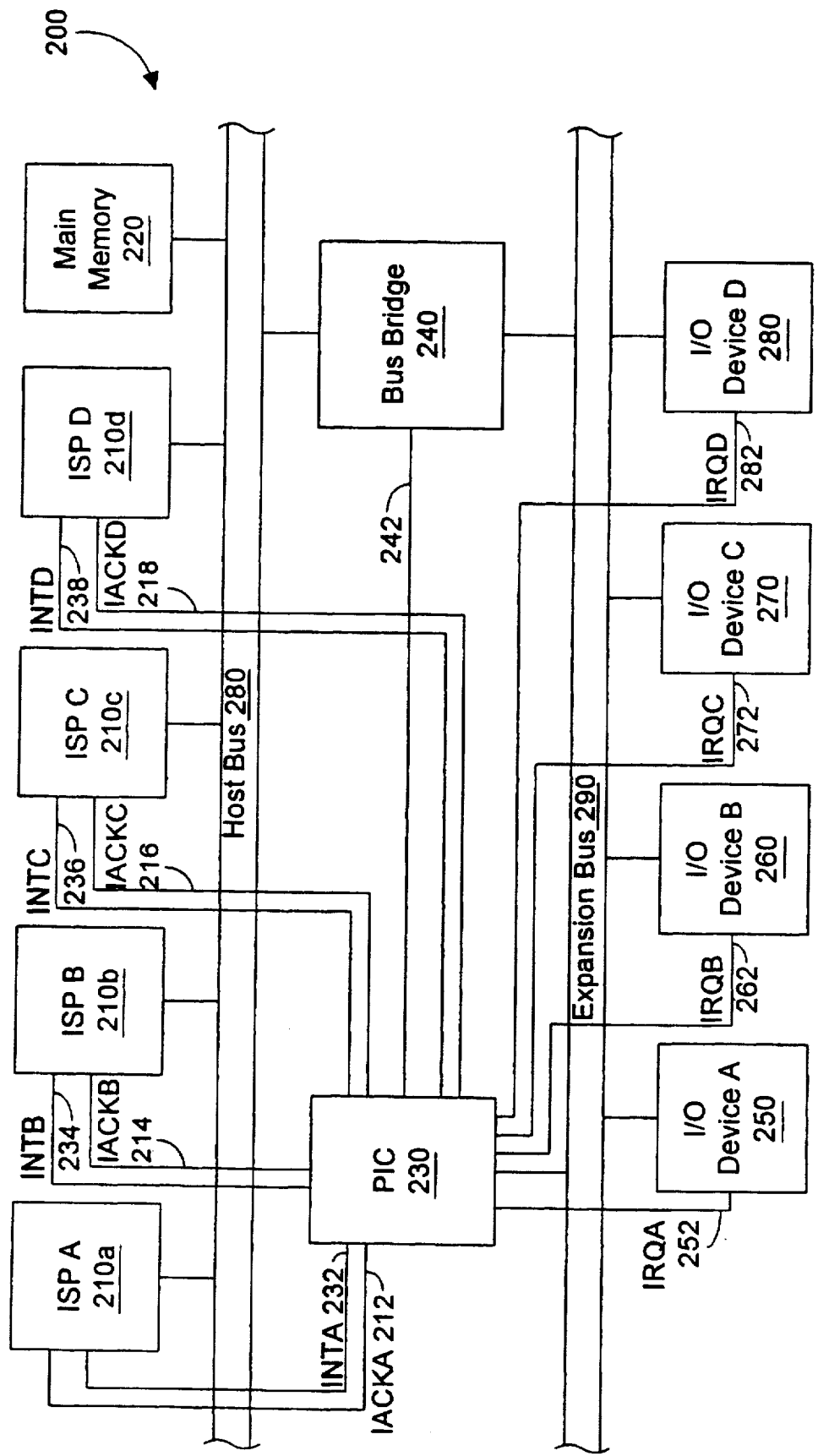
FIG. 2 is a block diagram illustrating a computer system with a programmable interrupt controller according to one embodiment of the present invention.

Referring now to the drawings, FIG. 2 is a block diagram of a computer system 200 including a programmable interrupt controller 230 according to one embodiment of the present invention. The computer system includes interrupt service providers (ISPs) 210a, 210b, 210c, and 210d, each coupled to a host bus 280, and a main memory system 220 coupled to the host bus 280. The ISPs may be central processing units (CPUs). The main memory system 220 includes a memory controller and system memory (not shown). A bus bridge 240 is coupled to the host bus 280 and an expansion bus 290. The expansion bus 290 conforms to a popular bus standard such as the Industry Standard Architecture (ISA), Extended Industry Standard Architecture (EISA), Microchannel Architecture (MCA), or Peripheral Component Interconnect (PCI). In other embodiments of the invention, multiple expansion buses are included, such as a PCI bus further coupled to an ISA bus. Several I/O devices 250, 260, 270, 280 are coupled to the expansion bus 290. The I/O devices 250, 260, 270, 280 are typically devices such as a floppy disk drive, video adapter, parallel port, or other devices as are well known in the art. It should be noted that in other embodiments, the number of processors and I/O devices are not necessarily equal. In other embodiments, different types and different numbers of I/O devices may be present.

The bus bridge 240 and the I/O devices 250, 260, 270 generate interrupt requests 242, 252, 262, 272, respectively, to notify one of the ISPs 210a, 210b, 210c, 210d that service is needed. The interrupt requests 242, 252, 262, 272 are collected by a programmable interrupt controller (PIC) 230. The programmable interrupt controller 230 is coupled to the host bus 280 and the expansion bus 290. When the programmable interrupt controller 230 receives one of the interrupt requests 242, 252, 262, 272 it determines whether or not to send an ISP interrupt signal 232, 234, 236, 238 to one of the ISPs 210a, 210b, 210c. Additionally, the programmable interrupt controller 230 receives interrupt acknowledge signals 212, 214, 216, 218 from the ISPs 210a, 210b, 210c, 210d, respectively. The programmable interrupt controller 230 may provide a interrupt vector to one of the ISPs 210a, 210b, 210c, 210d over the host bus 280. The interrupt vector indicates the location in memory of an interrupt service routine for handling the event that initiated the corresponding interrupt request. The programmable interrupt controller 230 is responsible for other interrupt management tasks as well. A more detailed description is given below for one embodiment of the programmable interrupt controller 230.

Figure 3:
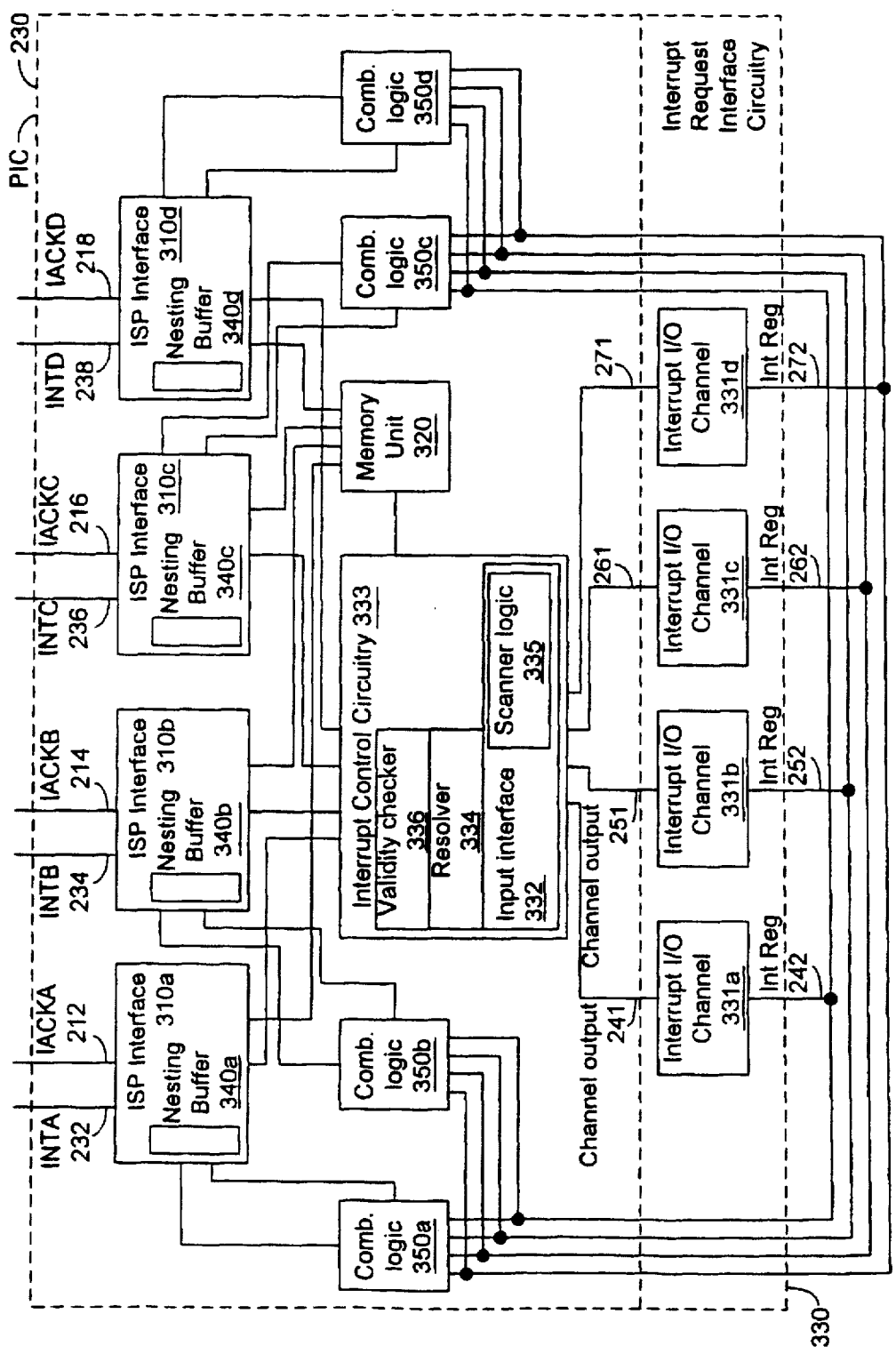
FIG. 3 is a block diagram of the programmable interrupt controller according to one embodiment of the present invention.

Referring now to FIG. 3, a block diagram is shown illustrating one embodiment of the programmable interrupt controller 230. The programmable interrupt controller 230 includes interrupt request interface circuitry 330 coupled to interrupt control circuitry 333. Interrupt request interface circuitry comprises a plurality of interrupt I/O channels 331a, 331b, 331c, and 331d corresponding to interrupt request lines 242, 252, 262, and 272. Interrupt control circuitry 333 includes an input interface 332, a resolver 334, and a validity checker 336. Central interrupt control circuitry 333 is further coupled to a plurality of ISP interface channels 310a, 310b, 310c, and 310d. Each ISP interface channel 310a, 310b, 310c, 310d includes a nesting buffer 340a, 340b, 320c, and 340d, respectively, for storing interrupt requests. The interrupt request lines 242, 252, 262 and 272 are each coupled to the inputs of combinatorial logic units 350a, 350b, 350c, 350d. The outputs and control lines of combinatorial logic units 350a, 350b, 350c and 350d are, in turn, coupled to ISP interface channels 310a, 310b, 310c, and 310d, respectively. Finally, central interrupt control circuitry 333 and ISP interface channels 310a, 310b, 310c, and 310d are each coupled to memory unit 320.

The interrupt request interface circuitry 330 receives the interrupt requests from the I/O devices along interrupt request lines 242, 252, 262, 272. The ISP interfaces 310a, 310b, 310c, 310d provide the ISP interrupt signals 232, 234, 236, 238, respectively, and receive the interrupt acknowledge signals 212, 214, 216, 218, respectively.

Interrupt request interface circuitry 330 comprises a plurality of interrupt I/O channels, 331a, 331b, 331c, and 331d. Each interrupt I/O channel outputs a logical high to central control circuit 333 upon a change of state (i.e., upon receipt or cancellation of an interrupt request). For example, if an edge-triggered interrupt is received on interrupt request line 242, interrupt I/O channel 331a will output a logical high along channel output line 241. Control circuit 333 will then proceed to process the interrupt request by marking the request as active (as will be discussed in more detail below) and cause interrupt I/O channel 331a to deassert the signal at the channel output line 241. Upon reception of the next rising edge, the I/O channel will again output a logical high along channel output line 241. If a level-triggered interrupt is received on interrupt request line 242, interrupt I/O channel 331a will again cause channel output line 241 to be asserted high, causing central control circuit 333 to mark the request as active and process it. Again, the central interrupt control circuitry 333 causes the interrupt I/O channel 331a to deassert the signal at the output line 241. If interrupt request line 242 goes low, indicating the deassertion of the interrupt, interrupt I/O channel 331a will again assert line channel output 241 high. Central interrupt control circuitry 333 will note that the interrupt was marked as active and will read the deassertion of the interrupt, clearing the interrupt as will be discussed in more detail below. Central interrupt control circuitry 333 will again cause the interrupt I/O channel 331 to deassert the signal at output line 241.

Input interface 332 of central interrupt control circuitry 333 includes scanner logic 335 which scans each channel output 241, 251, 261, and 271 of each interrupt I/O channel 331a, 331b, 331c, and 331d. In one embodiment, scanner logic 335 comprises a state machine which polls each channel output line 241, 251, 261, 271 in round-robin fashion. When an active interrupt request is detected by the input interface 332 on one of the channel output lines 241, 251, 261, 271, the central interrupt control circuitry 333 associates a status and a priority level with the interrupt request. This information, as well as other interrupt information, is stored as a field in the programmable interrupt controller 230 for each interrupt request.

In one embodiment, memory unit 320 is a random access memory (RAM). An exemplary field is shown in FIG. 5. The information field includes a state, an interrupt vector, a priority level, a destination, a mask indication, an affinity indication, whether the interrupt is edge or level triggered, and whether the interrupt is enabled or disabled. The state may indicate if the interrupt request is active, idle, in-service, or pending. The interrupt vector indicates the location of an interrupt service routine in main memory for a CPU to execute in order to handle the situation which initiated the interrupt request. The priority level is used to decide which interrupt requests are issued to a CPU first. The destination information may be used to specify to which ISP an interrupt request should be issued. The mask indication may be used to block a particular interrupt request from issuing to an ISP. The affinity indicator may show which ISP most recently executed the interrupt and may be used in conjunction with the destination information to determine which processor should receive the interrupt.

The central interrupt control circuitry 333 accesses the information stored in the memory unit 320 by generating read cycles to the memory unit 320 and by means of a unique interrupt identification code assigned to each interrupt request. For the currently selected interrupt request, the central interrupt control circuitry 333 reads the associated information field from the memory unit 320. Based on the current state of the input (242, 252, 262, or 272) for the currently selected interrupt request and associated information read from the memory unit 320, the central interrupt control circuitry 333 determines the next state for the selected interrupt request. The next state is then stored in the memory unit 320. The mask, priority level, and previous state information may be used by the central interrupt control circuitry 333 to determine the next state for the selected interrupt request. The next state may indicate if the interrupt request is valid, idle, in-service, or pending.

The central interrupt control circuitry 333 accesses the associated information in the memory unit 320 for the current interrupt request, and resolver 334 determines, according to the destination and affinity information, to which ISP interface 310a, 310b, 310c, or 310d the interrupt is to be sent. A particular ISP may be specified, or the interrupt may be sent to an ISP based on which one serviced it most recently (and hence might still have its service routine stored in cache).

Figure 4:
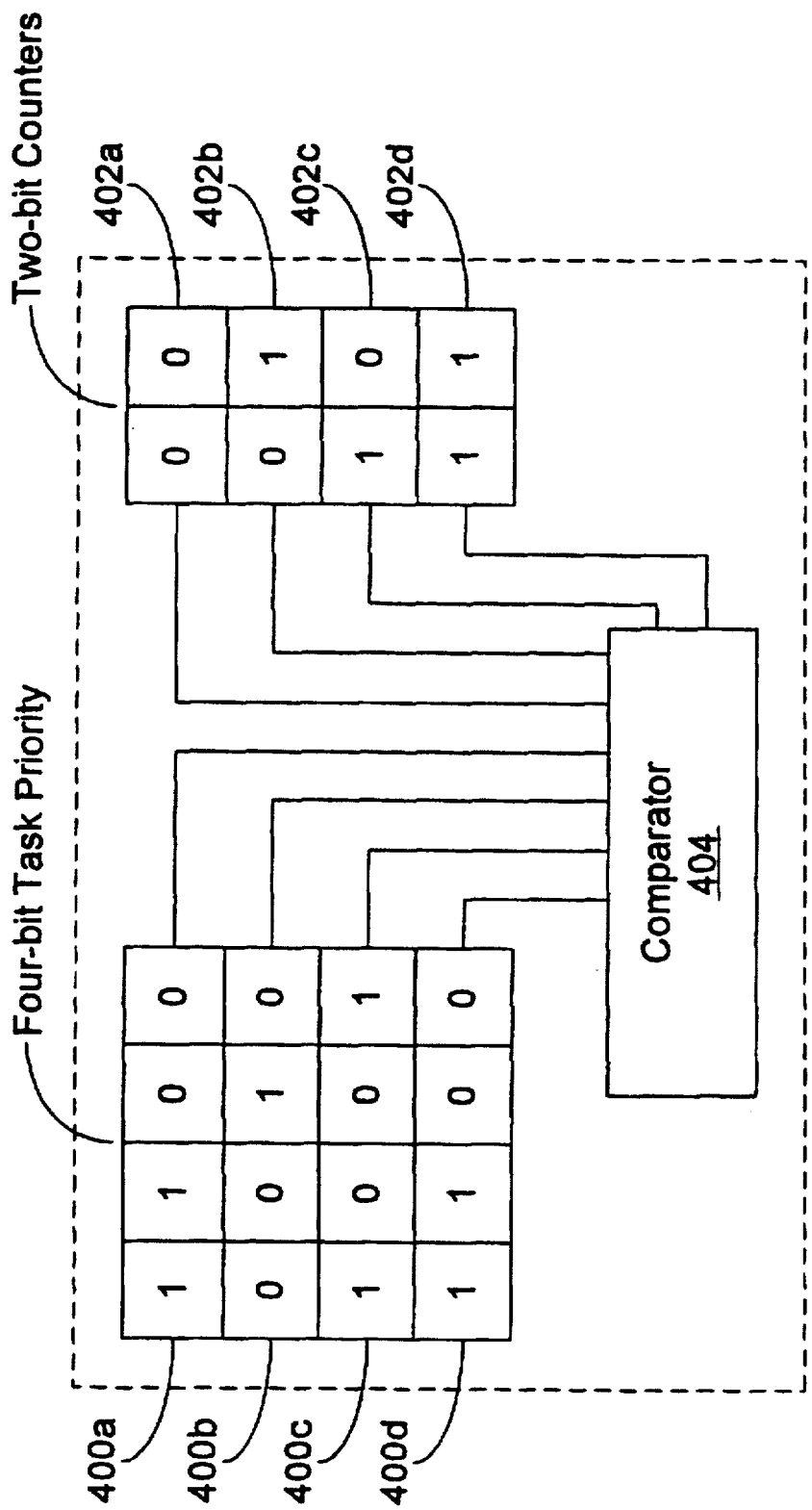
FIG. 4 illustrates a task priority resolution scheme according to one embodiment of the present invention.

In one embodiment, the interrupt is also routed to the ISP based on a task priority, indicating which ISP is executing the lowest priority task. The interrupt is routed to the ISP having the lowest task priority. For example, FIG. 4 shows a schematic representation of the task priority resolution process. In the exemplary system having four ISPs, the priority level of each device is represented by a four-bit binary number 440a, 400b, 400c, 400d, thereby allowing for sixteen task priority levels. If more than one device shares the same task priority, then the routing is made substantially randomly among the devices sharing the task priority level. This is accomplished through the use of a two-bit field 402a, 402b, 402c, 402d that is appended to the four-bit task priority number. The additional two bits function as the least significant bits in the resulting six-bit number. When the four-bit task priorities are identical, the remaining two bits are used to randomly route the interrupt. A comparator is also provided, to select the smallest six-bit number. For example, 400a and 400d show identical task priorities. Their corresponding two-bit extensions 400a, 402a are different. Accordingly, the comparator 404 will select the device corresponding to 400a and 402a.

So long as the two additional bits 402a, 402b, 402c, 402d are guaranteed to be different, the six-bit priority numbers will be different, even if the original four-bit task priority numbers 400a, 400b, 400c, 400d are the same. To ensure that a different device is selected at the next arbitration, the two-bit numbers 402a, 402b, 402c, 402d are updated after every arbitration. Accordingly, in one embodiment, the two-bit number fields are implemented as two-bit binary counters. The counters are initialized at start-up to ensure that each CPU is assigned a different two-bit number. After every arbitration, each counter is incremented synchronously and wrapped-around, if necessary. This ensures that the counters will always contain different values. It should be noted that on the two-bit number, as well as the four-bit number, may be stored in memory unit 320. Alternatively, the two- and four-bit numbers may be stored in resolver 334.

Once the interrupt has been assigned to a particular ISP, the appropriate ISP interfaces 310a, 310b, 310c, or 310d use the associated information for the current interrupt request to determine if and when to issue the interrupt request to an ISP by driving the corresponding ISP interrupt request 232, 234, 236, or 238 active. The priority level information may be used to determine when the selected interrupt request will issue to a ISP. The appropriate ISP interface 310a, 310b, 310c, or 310d may update the associated information in the memory 320 by accessing the memory unit 320 through the central interrupt control circuitry 333 in response to the appropriate interrupt acknowledge 212, 214, 216, 218 and end of interrupt being received. For example, the state information may be updated to in-service after an interrupt acknowledge is received or to idle after an end of interrupt is received.

Once the interrupt request has been routed to the appropriate ISP interface 310a, 310b, 310c, or 310d, the unique identification code for the current interrupt request is stored in an entry in the interrupt nesting buffer 340a, 340b, 340c, or 340d of the appropriate ISP interface 310a, 310b, 310c, 310d. In one embodiment, nesting buffers 340a, 340b, 340c, 310d need only store the interrupt identification according to priority. The remaining interrupt information may be referenced from memory unit 320. The nesting buffers 340a, 340b, 340c, or 340d each have a number of entries at least equal to the number of different interrupt priority levels. Each entry corresponds to a priority level. The priority level is used to determine when the interrupt request will issue. The highest priority interrupt requests held in each of the ISP interfaces 310a, 310b, 310c, 310d are issued first. Lower priority interrupt requests are held until they become the highest priority interrupt request. If a lower priority interrupt is currently being serviced, the higher priority interrupt will be given to the ISP. The former, lower priority interrupt will resume only after the higher priority interrupt has been completed. Thus, the maximum number of interrupts that may be given to a ISP at a given time is equal to the number of distinct priority levels supported by the system. Consequently, in one embodiment, the nesting buffers 340a, 340b, or 340c each have a number of entries equal to the number of different interrupt priority levels.

Determining when an interrupt request will issue based on priority is also referred to as resolving interrupt priority. The central interrupt control circuitry 333 uses the priority from the corresponding interrupt information to determine in which entry of the nesting buffer 340a, 340b, 340c, 340d the unique interrupt identification code is stored. The entry is marked as busy when a unique interrupt identification code is stored in the entry.

Each ISP interface 310a, 310b, 310c, 310d uses the unique interrupt identification code for the highest priority active entry in its respective interrupt nesting buffer 340a, 340b, 340c, 340d to access the corresponding interrupt information from the memory unit 320. In conjunction with validity checker 336, each ISP interface 310a, 310b, 310c, 310d uses the corresponding accessed information to determine if the corresponding interrupt request should be issued. For example, if the interrupt request is determined to be no longer valid, or is masked, the interrupt request may not issue to a CPU. More particularly, an ISP interface 310a, 310b, 310c, 310d may determine to void the corresponding interrupt request if the accessed information indicates that the corresponding interrupt request has become invalid while its unique interrupt identification code was pending in a nesting buffer 340a, 340b, 340c, 340d waiting to become highest priority. This period of waiting is referred to as interrupt latency. This latency may be relatively large, especially for low priority interrupt requests. The validity checker 320 monitors the validity of the interrupt requests stored within the ISP interfaces 310a, 310b, 310c, and 310d. If an interrupt request becomes invalid before it issues, the validity checker 320 indicates an invalid state for the interrupt request to the appropriate ISP interface 310a, 310b, 310c, and 310d to the central interrupt control circuitry 333. Thus, the invalid interrupt request is cleared (canceled) before it needlessly issues. In that case, the interrupt status in memory unit 320 is updated to idle. In one embodiment, the validity checker 336 monitors the condition of each input 241, 251, 261, and 271 to the scanner 335. If one of the interrupt request signals 242, 252, 262, 272 changes from active to inactive before the corresponding interrupt request issues to the ISP, then the validity checker 336 determines the interrupt request to be invalid. It is noted that in other embodiments, different methods and criteria may be used to determine the validity of an interrupt request.

When an interrupt request becomes the highest priority interrupt request in one of the ISP interfaces 310a, 310b, 310c, 310d, the appropriate ISP interface 310a, 310b, 310c, 310d issues the interrupt request to the corresponding ISP by driving active the appropriate ISP interrupt signal 232, 234, 236, 238. The validity checker 336 continues to monitor the validity of the interrupt request as described above. If the validity checker 336 determines that the interrupt request has become invalid before the ISP responds (i.e., by returning the interrupt acknowledge signal), then the interrupt request is cleared as described above and the appropriate ISP interface 310a, 310b, 310c, 310d drives inactive the corresponding ISP interrupt signal 232, 234, 236, or 238. Thus, the ISP may be prevented from needlessly responding to an invalid interrupt request.

If the interrupt request stays valid and an ISP responds by driving one of the interrupt acknowledge signals 212, 214, 216, 218 active, the corresponding ISP interface 310a, 310b, 310c, 310d receives the active interrupt acknowledge signal 212, 214, 216, 218 from the corresponding ISP. Also, the corresponding status entry is marked as in-service. The validity checker continues to monitor the validity of the corresponding interrupt request. If the request is valid at this point, the appropriate ISP interface 310a, 310b, 310c, 310d sends the corresponding interrupt vector over the host bus 280 to the ISP. The ISP executes the interrupt routine indicated by the interrupt vector and returns an end of interrupt (EOI) command to the programmable interrupt controller 230 over the host bus 280. When the appropriate ISP interface 310a, 310b, 310c, 310d receives the EOI command, the interrupt request is cleared. The status for the corresponding interrupt request is then changed to idle to indicate that the corresponding interrupt request signal 242, 252, 262, 272 input is available for a new interrupt request.

Finally, the next highest priority interrupt request is processed as described above, the appropriate ISP interface 310a, 310b, 310c, 310d accessing the interrupt information referenced by the unique interrupt identification code from the corresponding entry of the appropriate interrupt nesting buffer 340a, 340b, 340c, 340d.

Because of the interrupt latency problem, it is possible for the interrupt request to become invalid before the appropriate ISP interface 310a, 310b, 310c, 310d is ready to send the corresponding interrupt vector, but after the acknowledge interrupt has been received. More particularly, as discussed above, the validity checker circuit monitors the interrupt lines 241, 251, 261, 271, which are polled by scanner 332 on a round-robin basis. Thus, it is possible for a particular interrupt to become invalid between a first time it has been polled and the next. Consequently, there is provided combinatorial logic unit 350a, 350b, 350c, 350d coupled between the interrupt request lines 242, 252, 262, 272 and the ISP interfaces 310a, 310b, 310c, 310d with a control line activated by the particular interrupt then being serviced. In one embodiment, combinatorial logic units 350a, 350b, 350c, and 350d comprise multiplexers, but it is to be understood that other types of combinatorial logic circuits may be used. Each combinatorial logic unit 350a, 350b, 350c, 350d returns a signal to its corresponding interface channel when the particular interrupt that is being serviced becomes invalid prior to the ISP interface channel returning the interrupt vector to the ISP.

Upon reception of the combinatorial logic unit's signal indicating deassertion of the interrupt, the appropriate ISP interface 310a, 310b, 310c, 310d sends a spurious interrupt vector to its associated ISP instead of the interrupt vector. The spurious interrupt vector points to a much shorter routine than a regular interrupt vector. For example, a typical interrupt service routine may include ISP instruction to save register state information, read information from a device which initiated the interrupt request, and then determine how to respond to the interrupt request. In contrast, a typical spurious interrupt routine may instruct the ISP to immediately return to the ISP's previous operations. Thus the ISP does not needlessly waste time executing an interrupt routine for an invalid interrupt request. The interrupt request is then cleared and the appropriate ISP interface 310a, 310b, 310c, 310d goes on to the next highest priority interrupt request.

The source of the interrupt request signals 242, 252, 262, 272 are indicated in FIG. 2 to be I/O devices 250, 260, 270, 280 or bus bridge 240. However, it is noted that in other embodiments, different interrupt request sources may exist. Some of these other sources may be part of the same integrated circuit device in which the programmable interrupt controller 230 is implemented. These sources located within the same integrated circuit are referred to as internal interrupt request sources. One example of such a source is a timer which generates one or more internal interrupt requests according to programmable time out conditions. Also, interrupt requests may come from the ISP interfaces 310a, 310b, 310c, 310d in response to interrupt requests by the corresponding ISP.

Different types of interrupt requests such as those described above may require different handling in the programmable interrupt controller 230. A portion of the unique interrupt identification code may be used to distinguish between different types of interrupt requests for this purpose. For example, in one embodiment, one portion of the unique interrupt identification code may be used to distinguish between interrupt requests from internal and external sources. Another portion may be used to distinguish between interrupts from a timer or from an ISP.

More particularly, the information field stored in memory unit 320 for timer and inter-processor interrupts may differ from the information field for external interrupts. The interrupt information field for such interrupts will include status information for the individual ISPs. For example, the field will indicate whether the interrupt for each receiving ISP is active, dispatched, or acknowledged, as well as the destination, priority, and vector for each interrupt.

The invention described in the above detailed description is not intended to be limited to the specific form set forth herein, but on the contrary, it is intended to cover such alternatives, modifications, and equivalents, as can be reasonably included within the spirit and scope of the invention as defined.

What is claimed is:

1. A programmable interrupt controller for handling interrupt requests comprising:

interrupt request interface circuitry configured to receive a plurality of interrupt request signals, wherein said interrupt request interface circuitry includes a plurality of interrupt I/O channels;

central interrupt control circuitry coupled to said interrupt request interface circuitry, wherein said central interrupt control circuitry includes an input interface, wherein said central interrupt control circuitry is configured to process each of a plurality of interrupt request signals;

random access memory coupled to said central interrupt control circuitry, wherein said random access memory includes a plurality of storage locations wherein each of said plurality of storage locations is configured to store an entry corresponding to one of said plurality of interrupt request signals, said entry comprising a status field, an interrupt vector field, a priority field and a destination field, each said entry having a unique identification code, said locations in said random access memory being configured to be accessed via said unique identification code;

a plurality of interrupt service provider interface channels coupled to said central interrupt control circuitry and to said random access memory, wherein said plurality of interrupt service provider interface channels is configured to issue an interrupt signal to one or more interrupt service providers.

2. The programmable interrupt controller as recited in claim 1, wherein said input interface includes scanner logic, wherein said interrupt request interface circuitry includes a plurality of channel output lines, and wherein said scanner logic polls each of said plurality of channel output lines to detect one or more of said plurality of interrupt request signals.

3. The programmable interrupt controller as recited in claim 1, wherein said central interrupt control circuitry includes a validity checker configured to access each of said entries via said unique identification code and determine whether each said entry corresponds to a valid one of said interrupt requests.

4. The programmable interrupt controller as recited in claim 1, wherein said central interrupt control circuitry includes a resolver configured to access said entries via said unique identification codes and to select one of said interrupt service providers to service one of said interrupt requests.

5. The programmable interrupt controller as recited in claim 4, wherein said resolver is configured to select a first one of said interrupt service providers, said first interrupt service provider having a lowest priority among said interrupt service providers.

6. The programmable interrupt controller as recited in claim 5, wherein said resolver is configured to randomly select said first interrupt service provider from two or more of said interrupt service providers which have said lowest priority.

7. The programmable interrupt controller as recited in claim 2, wherein said central interrupt control circuitry includes a validity checker configured to access each of said entries via said unique identification code and determine whether each said entry corresponds to a valid one of said interrupt requests, and a resolver configured to access said entries via said unique identification codes and to select one of said interrupt service providers to service one of said interrupt requests.

8. The programmable interrupt controller as recited in claim 1, wherein each said entry includes an affinity field which specifies a particular one of said interrupt service providers which most recently serviced said one of said plurality of interrupt request signals.

9. The programmable interrupt controller as recited in claim 1, further comprising a combinatorial logic circuit having a plurality of inputs coupled to said plurality of interrupt I/O channels, said combinatorial logic circuit further having one or more outputs coupled to said interrupt service provider interface channels, said combinatorial logic circuit being configured to generate a signal indicative of an invalid interrupt request on one or more of said interrupt service provider interface channels.

10. The programmable interrupt controller as recited in claim 1 wherein said interrupt service provider interface channels are configured to access a first one of said entries in said random access memory upon completion of service of a corresponding interrupt request and update said first entry to indicate completion of service of said corresponding interrupt request.

11. A method for handling interrupt requests in an interrupt controller configured to receive a plurality of interrupt requests, wherein said interrupt controller comprises a random access memory configured to store information associated with each one of said plurality of interrupt requests, said controller further comprising a plurality of interrupt service provider interface channels, said controller being coupled to one or more interrupt service providers, the method comprising:

receiving one or more of said plurality of interrupt requests;

storing said information associated with said one or more received interrupt requests in said random access memory, wherein said information is indexed in said random access memory according to a unique identification code associated with each said one or more received interrupt requests;

providing said unique identification code to said plurality of interrupt service provider interface channels;

accessing said information from said interrupt service provider interface channels;

distributing said received interrupt requests according to said information; and issuing said received interrupt requests to said one or more interrupt service providers.

12. The method for handling interrupt requests recited in claim 11, further comprising updating said random access memory upon completion of said issued interrupt requests.

13. The method for handling interrupt requests recited in claim 11, wherein said information comprises a destination field and wherein said step of distributing comprises selecting one of said interrupt service providers which is specified by said destination field.

14. The method for handling interrupt requests recited in claim 11, wherein said information comprises an affinity field and wherein said step of distributing comprises selecting one of said interrupt service providers which is specified by said affinity field.

15. The method for handling interrupt requests recited in claim 11, wherein said step of distributing comprises selecting one of said interrupt service providers which has a lowest priority among said interrupt service providers.

16. The programmable interrupt controller as recited in claim 15, wherein said selecting comprises randomly selecting said first interrupt service provider from two or more of said interrupt service providers which have said lowest priority.

* * * * *